(12) United States Patent
Sakai et al.

(10) Patent No.: US 11,577,751 B2
(45) Date of Patent: Feb. 14, 2023

(54) CONTROL DEVICE FOR VEHICLE AND OCCUPANT TRANSPORTATION SYSTEM

(71) Applicant: Toyota Jidosha Kabushiki Kaisha, Toyota (JP)

(72) Inventors: Katsuhiro Sakai, Hadano (JP); Makoto Kawaharada, Shizuoka-ken (JP); Akihide Tachibana, Susono (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 16/682,319

(22) Filed: Nov. 13, 2019

(65) Prior Publication Data
US 2020/0189610 A1 Jun. 18, 2020

(30) Foreign Application Priority Data

Dec. 13, 2018 (JP) .............................. JP2018-233593

(51) Int. Cl.
*B60W 60/00* (2020.01)
*F02D 41/10* (2006.01)
*B60W 50/00* (2006.01)

(52) U.S. Cl.
CPC .... *B60W 60/0016* (2020.02); *B60W 50/0098* (2013.01); *B60W 60/00253* (2020.02); *B60W 60/00256* (2020.02); *F02D 41/10* (2013.01); *B60W 2540/01* (2020.02); *B60W 2540/041* (2020.02); *B60W 2540/043* (2020.02); *B60W 2540/049* (2020.02); *B60W 2540/221* (2020.02);

(Continued)

(58) Field of Classification Search
CPC ....... B60W 60/0016; B60W 60/00253; B60W 60/00256; B60W 50/0098; B60W 2720/106; B60W 2720/125; B60W 2540/221; B60W 2540/043; B60W 2540/01; B60W 2540/041; B60W 2540/223; B60W 2540/049; B60W 50/085; B60W 2050/0075; B60W 60/0013; B60W 50/00; F02D 41/10; F02D 2250/26; F02D 2200/701; F02D 2200/702; F02D 41/107; G06Q 50/30; H04W 4/44; H04W 4/46; G06K 9/00838; G05D 1/00
See application file for complete search history.

(56) References Cited

U.S. PATENT DOCUMENTS 10,053,088 B1 * 8/2018 Askeland ............... B60N 2/002
10,471,953 B1 * 11/2019 Askeland ............... H04N 7/183
10,692,371 B1 * 6/2020 Nix ....................... G08G 1/0968
(Continued)

FOREIGN PATENT DOCUMENTS

JP H8337133 A 12/1996
JP 2014-240233 A 12/2014
(Continued)

*Primary Examiner* — Jason Holloway
(74) *Attorney, Agent, or Firm* — Dinsmore & Shohl LLP

(57) ABSTRACT

A control device for a vehicle includes an upper limit value setting unit configured to set an upper limit value of an acceleration or deceleration of the vehicle, and a vehicle controller configured to control the vehicle such that the acceleration or deceleration does not exceed the upper limit value. The upper limit value setting unit is configured to change the upper limit value according to at least one predetermined condition.

15 Claims, 11 Drawing Sheets

(52) U.S. Cl.
CPC . *B60W 2540/223* (2020.02); *B60W 2720/106* (2013.01); *B60W 2720/125* (2013.01)

(56) References Cited

U.S. PATENT DOCUMENTS

| | | |
|---|---|---|
| 10,866,106 B2 | 12/2020 | Arakawa |
| 10,991,176 B2 | 4/2021 | Yoshizaki et al. |
| 10,991,254 B2 | 4/2021 | Hayashi et al. |
| 11,048,263 B2 | 6/2021 | Urano |
| 11,052,780 B2 | 7/2021 | Taguchi et al. |
| 11,215,982 B2 | 1/2022 | Urano et al. |
| 11,281,215 B2 | 3/2022 | Yoshizaki et al. |
| 11,325,618 B2 | 5/2022 | Umeda |
| 2017/0123421 A1* | 5/2017 | Kentley ............. G06Q 10/00 |
| 2019/0193722 A1* | 6/2019 | Yamamuro ........ G05D 1/0088 |

FOREIGN PATENT DOCUMENTS

| | | |
|---|---|---|
| JP | 2018-062197 A | 4/2018 |
| JP | 2018-097737 A | 6/2018 |

* cited by examiner

CONTROL DEVICE FOR VEHICLE AND OCCUPANT TRANSPORTATION SYSTEM

CROSS-REFERENCE TO RELATED APPLICATIONS

This application claims priority to Japanese Patent Application No. 2018-233593 filed on Dec. 13, 2018, which is incorporated herein by reference in its entirety including the specification, drawings and abstract.

BACKGROUND

1. Technical Field

The disclosure relates to a control device for a vehicle and an occupant transportation system.

2. Description of Related Art

In the related art, as described in Japanese Unexamined Patent Application Publication No. 08-337133 (JP 08-337133 A), a technique that changes an acceleration characteristic of a vehicle according to the presence or absence of a fellow passenger in order to restrain a fellow passenger from feeling uncomfortable due to a vehicle operation of a driver is known.

SUMMARY

On the other hand, in recent years, an autonomous driving vehicle capable of autonomous traveling has been developed, and various services using an autonomous driving vehicle have been examined. For example, the use of an autonomous driving vehicle instead of a taxi or a delivery vehicle in the related art is considered.

In a case where an upper limit value of an acceleration or deceleration of a vehicle is set to be small, the vibration of the vehicle is reduced; however, the traveling performance of the vehicle is degraded. For this reason, in order to efficiently operate a vehicle while securing safety of an occupant, there is a need to set the upper limit value of the acceleration or deceleration of the vehicle to an appropriate value. In an autonomous driving vehicle in which a driver is not present, when the upper limit value of the acceleration or deceleration of the vehicle is set, a viewpoint different from a vehicle in the related art is needed.

The disclosure provides a technique that sets an upper limit value of an acceleration or deceleration of a vehicle to an appropriate value in a case where the vehicle is made to autonomously travel.

The gist of the present disclosure is as follows.

(1) A first aspect of the disclosure relates to a control device for a vehicle that controls a vehicle autonomously traveling. The control device includes an upper limit value setting unit and a vehicle controller. The upper limit value setting unit is configured to set an upper limit value of an acceleration or deceleration of the vehicle. The vehicle controller is configured to control the vehicle such that the acceleration or deceleration does not exceed the upper limit value. The upper limit value setting unit changes the upper limit value according to at least one predetermined condition.

(2) In the control device according to (1), the upper limit value setting unit may be configured to change the upper limit value according to the presence or absence of an occupant of the vehicle.

(3) In the control device according to (1) or (2), the upper limit value setting unit may be configured to, in a case where an occupant is present in the vehicle, change the upper limit value according to a posture of the occupant.

(4) In the control device according to any one of (1) to (3), the upper limit value setting unit may be configured to, in a case where an occupant is present in the vehicle, change the upper limit value according to the presence or absence of wearing of a seat belt on the occupant.

(5) in the control device according to any one of (1) to (4), the upper limit value setting unit may be configured to, in a case where an occupant is present in the vehicle, change the upper limit value according to the presence or absence of a disabled person.

(6) In the control device according to any one of (1) to (5), the upper limit value setting unit may be configured to, in a case where an occupant is present in the vehicle, change the upper limit value according to an age of the occupant.

(7) In the control device according to any one of (1) to (6), the upper limit value setting unit may be configured to, in a case where an occupant is present in the vehicle, set the upper limit value to a value designated by the occupant.

(8) In the control device according to any one of (1) to (7), the upper limit value setting unit may be configured to transmit the change of the upper limit value to an occupant of the vehicle.

(9) in the control device according to any one of (1) to (8), the upper limit value setting unit is configured to change the upper limit value according to the presence or absence of a package.

(10) In the control device according to any one of (1) to (9), the upper limit value setting unit may be configured to, in a case where the vehicle transports a package, change the upper limit value according to a total weight of the package.

(11) In the control device according to (10), the upper limit value setting unit may be configured to, in a case where the vehicle transports a package, change the upper limit value according to a loading rate of the vehicle.

(12) In the control device according to any one of (1) to (11), the upper limit value setting unit may be configured to, in a case where the vehicle transports a package, change the upper limit value according to strength of the package.

(13) In the control device according to any one of (1) to (12), the upper limit value setting unit may be configured to, in a case where the vehicle transports a package, sets the upper limit value to a value designated by a person.

(14) In the control device according, to any one of (1) to (13), the upper limit value setting unit may be configured to change the upper limit value according to a desired arrival time at a destination.

(15) A second aspect of the disclosure relates to an occupant transportation system. The occupant transportation system includes a server, a vehicle controller, and an upper limit value setting unit. The server is configured to create a traveling plan based on a vehicle allocation request from a user. The vehicle controller is configured to control a vehicle based on the traveling plan. The upper limit value setting unit is configured, to set an upper limit value, of an acceleration or deceleration of the vehicle. The upper limit value setting unit is configured to change the upper limit value according to at least one predetermined condition. The vehicle controller is configured to control the vehicle such that the acceleration or deceleration does not exceed the upper limit value.

According to the aspects of the disclosure, in a case where a vehicle is made to autonomously travel, it is possible to set an upper limit value of an acceleration or deceleration of the vehicle to an appropriate value.

BRIEF DESCRIPTION OF THE DRAWINGS

Features, advantages, and technical, and industrial significance of exemplary embodiments of the disclosure will be described below with reference to the accompanying drawings, in which like numerals denote like elements, and, wherein.

DETAILED DESCRIPTION OF EMBODIMENTS

Figure 1:
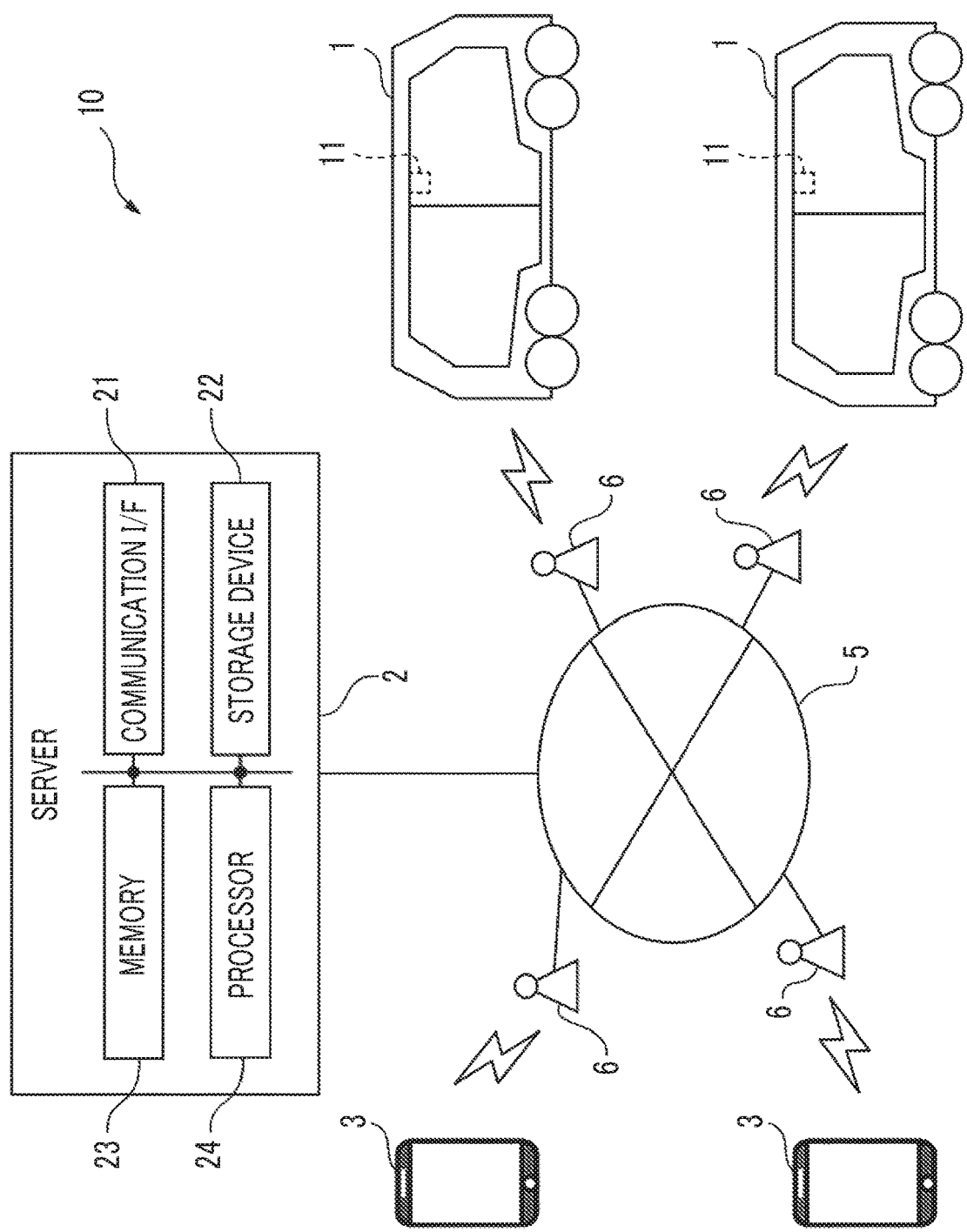
FIG. 1 is a schematic configuration diagram of an occupant transportation system according to a first embodiment of the disclosure.

Hereinafter, embodiments of the disclosure will be described referring to the drawings. In the following description, the same components are represented by the same reference numerals.

First Embodiment

Hereinafter, a first embodiment of the disclosure will be described referring to FIGS. 1 to 5. FIG. 1 is a schematic configuration diagram of an occupant transportation system according to the first embodiment of the disclosure, An occupant transportation system 10 provides a mobility service, such as a car-sharing service or a ride-sharing service. Specifically, the occupant transportation system 10 transports occupants including a user to a desired destination using a vehicle 1 capable of autonomous traveling according to a vehicle allocation request from the user. In the ride-sharing service, a plurality of users having similar destinations can use one vehicle 1 simultaneously.

As shown in FIG. 1, the occupant transportation system 10 includes a vehicle 1, a server 2, and a portable terminal 3. The vehicle 1, the server 2, and the portable terminal 3 are communicable with one another. The server 2 receives the vehicle allocation request from the user through the portable terminal 3 and creates a traveling plan based on the vehicle allocation request.

The vehicle 1 is configured to transport an occupant through autonomous traveling. The vehicle 1 autonomously travels based on the traveling plan created by the server 2 and transports the occupant to the destination. That is, the vehicle 1 is an autonomous driving vehicle that autonomously travels, and does not need a driver who operates the vehicle 1. In the mobility service, a plurality of vehicles 1 is used such that many users can use the service. The vehicle 1 is managed by a service provider that provides the mobility service.

Figure 2:
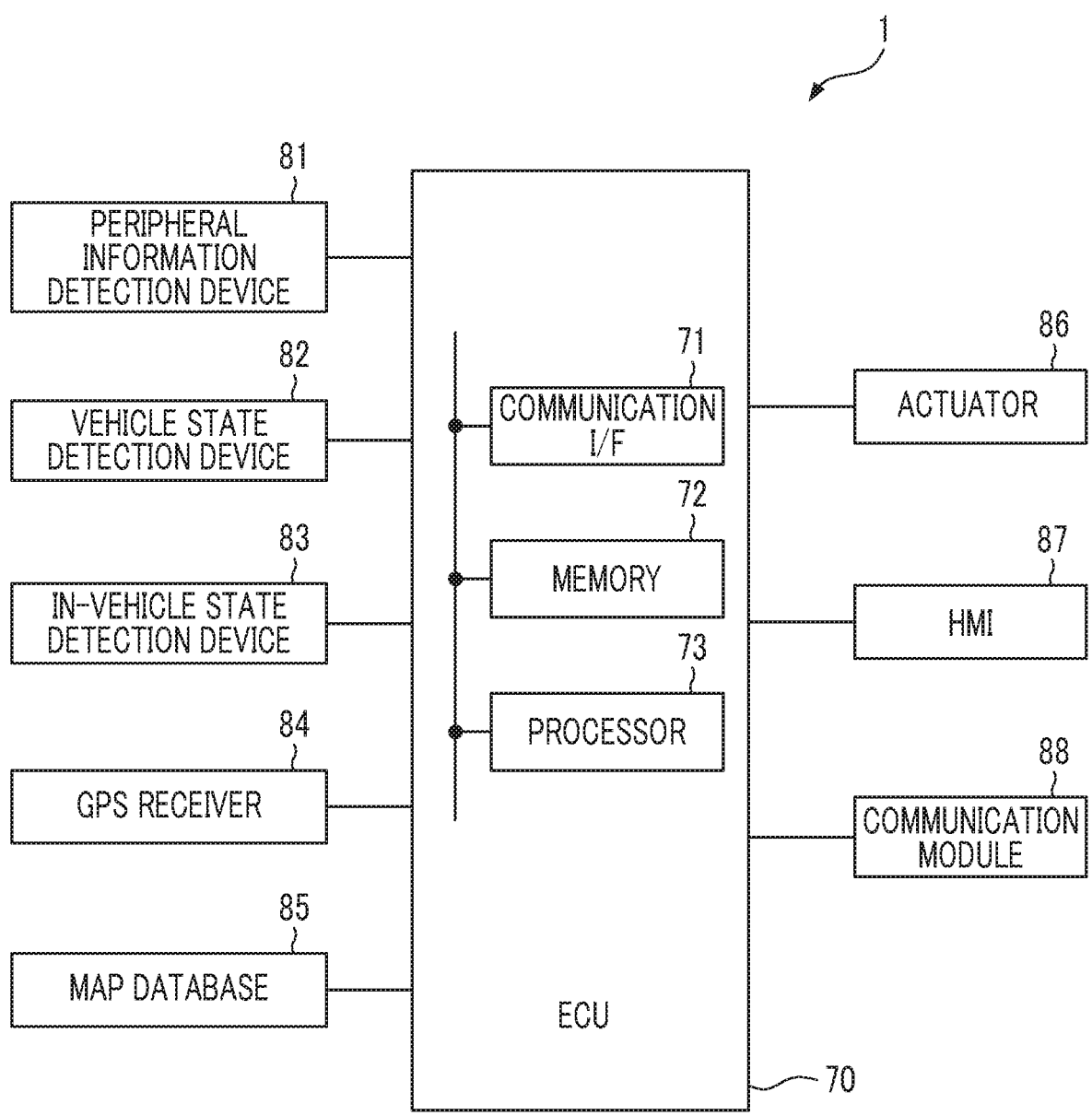
FIG. 2 is a diagram schematically showing the configuration of a vehicle.

FIG. 2 is a diagram schematically showing the configuration of the vehicle 1. The vehicle 1 includes an electronic control unit (ECU) 70. The ECU 70 includes a communication interface 71, a memory 72, and a processor 73, and executes various kinds of control of the vehicle 1. The communication interface 71 and the memory 72 are connected to the processor 73 through signal lines. The ECU 70 is an example of a control device for the vehicle 1. In the embodiment, although one ECU 70 is provided, a plurality of ECUs may be provided for the individual functions.

The communication interface 71 has an interface circuit for connection to the ECU 70 to an in-vehicle network conforming to a standard, such as a controller area network (CAN). The ECU 70 communicates with other in-vehicle equipment through the communication interface 71.

The memory 72 has, for example, a volatile semiconductor memory (for example, a RAM) and a nonvolatile semiconductor memory (for example, a ROM). The memory 72 stores a program that is executed in the processor 73, various kinds of data that are used when various kinds of processing are executed by the processor 73, and the like, The processor 73 has one a plurality of central processing units (CPUs) and peripheral circuits, and executes various kinds of processing. The processor 73 may further have an arithmetic circuit, such as a logical arithmetic unit or a numerical, arithmetic unit.

The vehicle 1 includes a peripheral information detection device 81. The peripheral information detection device 81 detects peripheral information of the vehicle 1 for autonomous traveling of the vehicle 1. In the peripheral information, information regarding white lines of roads, other vehicles, pedestrians, bicycles, buildings, traffic signs, traffic signals, obstacles, and the like is included. The peripheral information detection device 81 is connected to the ECU 70 through the in-vehicle network, and an output of the peripheral information detection device 81 is transmitted to the ECU 70. For example, the peripheral information detection device 81 includes an outside-vehicle camera, a millimeter wave radar, laser imaging detection and ranging (LIDAR), an ultrasonic sensor, or the like. The outside-vehicle camera images the outside of the vehicle 1 to generate a peripheral image.

The vehicle 1 includes a vehicle state detection device 82. The vehicle state detection device 82 detects a state of the vehicle 1 for autonomous traveling of the vehicle 1. The vehicle state detection device 82 is connected to the ECU 70 through the in-vehicle network, and an output of the vehicle state detection device 82 is transmitted to the ECU 70. For example, the vehicle state detection device 82 includes a vehicle speed sensor, a yaw rate sensor, and the like. The vehicle speed sensor detects a speed of the vehicle 1. The yaw rate sensor detects a yaw rate that is a rotation speed around a vertical axis passing through the center of gravity of the vehicle 1.

The vehicle 1 includes an in-vehicle state detection device 83. The in-vehicle state detection device 83 detects a state inside the vehicle 1. For example, the in-vehicle state detection device 83 detects an occupant inside the vehicle 1 and detects boarding or unboarding of an occupant. The in-vehicle state detection device 83 is connected to the ECU 70 through the in-vehicle network, and an output of the in-vehicle state detection device 83 is output to the ECU 70. For example, the in-vehicle state detection device 83 includes an in-vehicle camera 11, a seat belt sensor, a seating sensor, an information reader, and the like.

The in-vehicle camera 11 images the inside the vehicle 1 to generate an in-vehicle image. As shown in FIG. 1, the in-vehicle camera 11 is arranged, for example, on a ceiling or the like of the vehicle 1. The in-vehicle camera 11 may be a plurality of cameras arranged at different positions in the vehicle 1.

The seat belt sensor detects whether or not an occupant wears a seat belt. The seating sensor detects whether or not an occupant sits on a seat. The seat belt sensor and the seating sensor are provided for each seat. The information reader reads identification information of the portable terminal 3 as identification information of the user, a QR code (Registered Trademark) or a password transmitted to the user as vehicle allocation information, card information of a use card for using the mobility service, or the like. The information reader is arranged near a door of the vehicle 1 or for each seat.

The vehicle 1 includes a GPS receiver 84, The GPS receiver 84 receives signals from three or more GPS satellites and detects a current position (for example, the latitude and longitude of the vehicle 1) of the vehicle 1. The GPS receiver 84 is connected to the ECU 70 through the in-vehicle network, and an output of the GPS receiver 84 is transmitted to the ECU 70.

The vehicle 1 includes a map database 85. The map database 85 stores map information. The map database 85 is connected to the ECU 70 through the in-vehicle network, and the ECU 70 acquires the map information from the map database 85. The map information stored in the map database 85 is updated using, data received from the outside of the vehicle 1, a simultaneous localization and mapping (SLAM) technique, and the like.

The vehicle 1 includes an actuator 86. The actuator 86 operates the vehicle 1. The actuator 86 is connected to the ECU 70 through the in-vehicle network, and the ECU 70 controls the actuator 86. For example, the actuator 86 includes a drive device (at least one of an engine and a motor) for acceleration of the vehicle 1, a brake actuator for braking of the vehicle 1, a steering motor for steering of the vehicle 1, a door actuator for opening and closing of the door of the vehicle 1, and the like.

The vehicle 1 includes a human machine interface (HMI) 87. The HMI 87 is an input/output device that performs input and output of information between an occupant and vehicle 1. The HMI 87 includes, for example, a display that displays information, a speaker that generates sound, an operation button or a touch screen that allows the user to perform an input operation, a microphone that receives voice of the occupant, and the like. The HMI 87 provides the occupant of the vehicle 1 with information (the current position of the vehicle 1, weather, an outside air temperature, or the like) and entertainment (music, movie, TV program, a game, or the like). The HMI 87 is connected to the ECU 70 through the in-vehicle network, an output of the ECU 70 is transmitted to the occupant through the HMI 87, and an input from the occupant is transmitted to the ECU 70 through the HMI 87.

The vehicle 1 includes a communication module 88. The communication module 88 is equipment that enables communication between the vehicle 1 and the outside of the vehicle 1. The communication module 88 includes, for example, a data communication module (DCM)) and a short-distance wireless communication module (for example, WiFi module, Bluetooth (Registered Trademark) module, or the like). The vehicle 1 communicates with the server 2 through the data communication module, a wireless base station 6, and a communication network 5. The vehicle 1 communicates with the portable terminal 3 (see FIG. 1) of the occupant of the vehicle 1, road-side equipment, other vehicles, an IC tag, and the like through the short-distance wireless communication module.

The server 2 is provided outside the vehicle 1 and manages the user and the vehicle 1 in order to efficiently provide the mobility service. Specifically, the server 2 performs registration of user information, matching between the user and the vehicle 1, creation of the traveling plan, settlement of a use charge, and the like. The server 2 is managed by the service provider that provides the mobility service.

As shown in FIG. 1, the server 2 includes a communication interface 21 storage device 22, a memory 23, and a processor 24. The communication interface 21, the storage device 22, and the memory 23 are connected to the processor 24 through signal lines. The server 2 may further include an input device, such as a keyboard and a mouse, an output, such as a display, and the like. The server 2 may be constituted of a plurality of computer.

The communication interface 21 has an interface circuit for connection of the server 2 to the communication network 5. The server 2 communicates with the vehicle 1 and the portable terminal 3 through the communication interface 21, the communication network 5, and the wireless base station 6.

The storage device 22 has, for example, a hard disk drive (HDD), a solid state drive (SSD), or an optical recording medium. The storage device 22 stores various kinds of data, and stores, for example, the user information, vehicle information, the map information, a computer program that allows the processor 24 to execute various kinds of processing, and the like. The computer program may be distributed in a state of being recorded on a recording medium, such as an optical, recording medium or a magnetic recording medium.

The memory 23 has, for example, a semiconductor memory, such as a random access memory (RAM). The memory 23 stores various kinds of data and the like that are used, for example, when various kinds of processing are executed by the processor 24.

The processor 24 has one or a plurality of CPUs and peripheral circuits, and executes various kinds of processing. The processor 24 may further have an arithmetic circuit, such as a logical arithmetic unit or a numerical arithmetic unit.

The portable terminal 3 is possessed by the user and can be moved along with the user. The portable terminal 3 is equipment that is communicable with the server 2 through the wireless base station 6 and the communication network 5. The portable terminal 3 is an input/output device including an input device, such as a touch panel and a microphone, and an output device, such as a display and a speaker. The portable terminal 3 is, for example, a smartphone, a tablet terminal, a personal computer, or the like.

Figure 3:
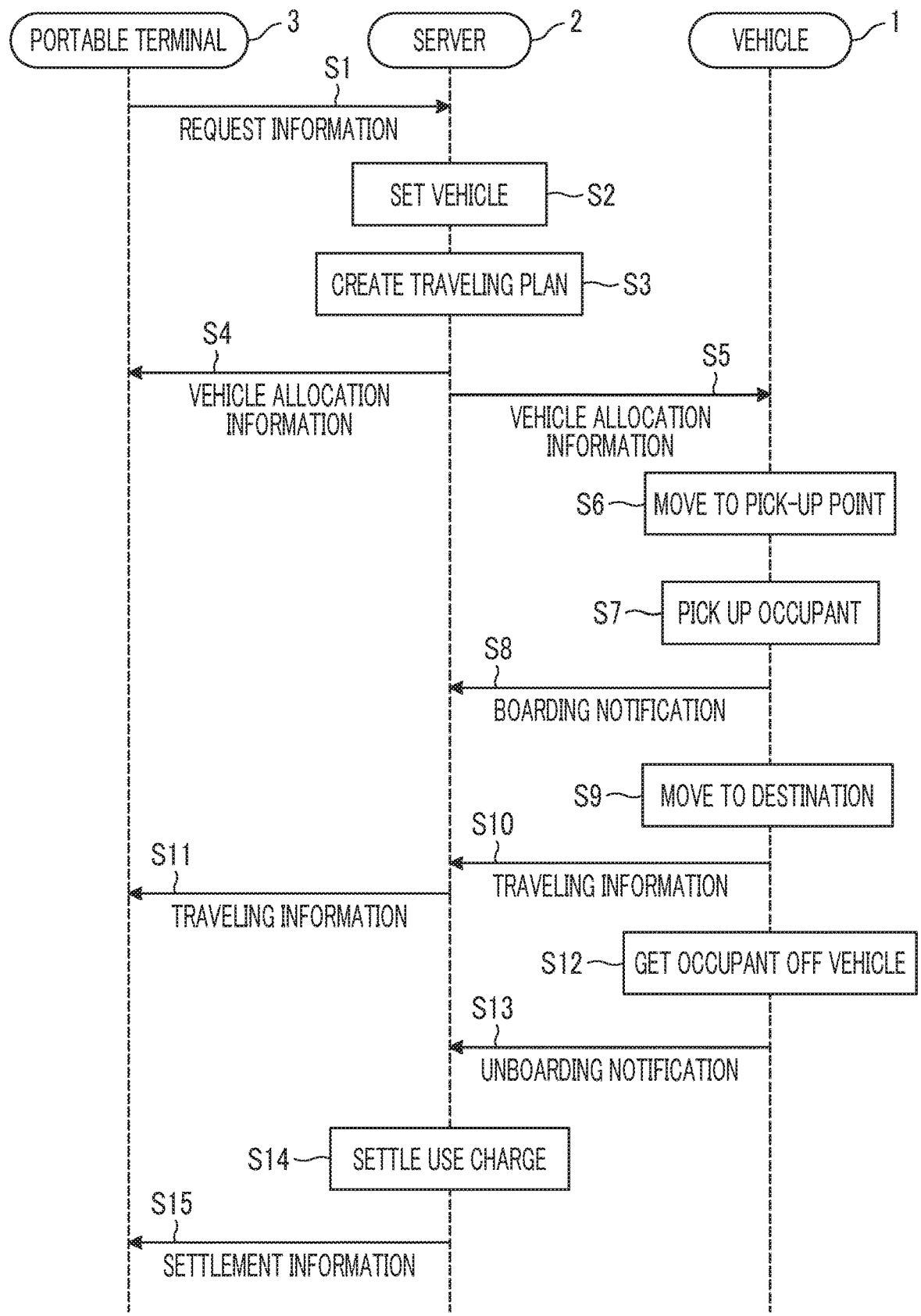
FIG. 3 is a sequence diagram showing an example of an operation of the occupant transportation system.

Hereinafter, a series of flow of the mobility service will be simply described referring to FIG. 3. FIG. 3 is a sequence diagram showing an example of the operation of the occupant transportation system 10. In the sequence diagram, communication between the server 2 and the portable terminal 3 and communication between the server 2 and the vehicle 1 are performed through the communication network 5.

The user who uses the mobility service registers the user information using the portable terminal 3 or the like in advance. The registered user information is stored in the storage device 22 of the server 2 for each user. In a case of requesting the use of the mobility service, that is, in a case of performing the vehicle allocation request, the user operates the portable terminal 3 to input request information to the portable terminal 3. The input of the request information is performed, for example, on an application for a mobility service installed on the portable terminal 3.

In a case where the request information is input to the portable terminal 3, the portable terminal 3 transmits the request information to the server 2 (Step S1). In the request information, a pick-up point (for example, a current position of the user), a destination, the identification information of the user (for example, a registration number of the user), fellow passenger information (the number of occupants or the like), permission and prohibition of ride-sharing with another person, and the like. The pick-up point means a desired boarding position of the user.

In a case where the request information is received from the user through the portable terminal 3, the server 2 sets the vehicle 1 suitable for the transportation of the user (Step S2). That is, the server 2 performs matching between the user and the vehicle 1. The vehicle 1 suitable for the transportation of the user is, for example, the vehicle 1 that is on standby at a point closest to the pick-up point. In a case where the user permits ride-sharing with another person, the vehicle 1 that is in use by another user may be selected.

The server 2 creates a traveling plan for the transportation of the user (Step S3). In the traveling plan, a predicted arrival time at the pick-up point, a traveling route to a destination, a predicted arrival time at the destination, and the like are included.

Next, the server 2 transmits vehicle allocation information to the portable terminal 3 (Step S4). In the vehicle allocation information that is transmitted to the portable terminal 3, a predicted arrival time at the pick-up point, a traveling route to the destination, a predicted arrival time at the destination, identification information (a number on a number plate, a vehicle type, color, and the like) of the vehicle 1, the presence or absence of ride-sharing with another person, and the like are included. The server 2 transmits the vehicle allocation information to the vehicle 1 (Step S5). In the vehicle allocation information that is transmitted to the vehicle 1, the pick-up point, the destination, a traveling route to the destination, the identification information of the user, the number of occupants, and the like.

In a case where the vehicle allocation information is received from the server 2, the vehicle 1 starts to move to the pick-up point (Step S6). Thereafter, in a case of arriving at the pick-up point, the vehicle 1 picks up an occupant (the user or the user and a fellow passenger) (Step S7).

After the occupant boards, the vehicle 1 notifies the server 2 that the occupant boards. Specifically, the vehicle 1 transmits a boarding notification to the server 2 (Step S8). After the occupant boards, the vehicle 1 starts to move to the destination (Step S9).

While the vehicle 1 is moving to the destination, the vehicle 1 transmits traveling information to the server 2 at predetermined intervals (Step S10). In the traveling information that is transmitted to the server 2, a current position of the vehicle 1, peripheral information of the vehicle 1, and the like are included. While the vehicle 1 is moving to the destination, the server 2 transmits traveling information to the portable terminal 3 at predetermined intervals (Step S11). In the traveling information that is transmitted to the portable terminal 3, a current position of the vehicle 1, a predicted arrival time at the destination, congestion information of the traveling route, and the like are included.

Thereafter, in a case of arriving at the destination, the vehicle 1 gets the occupant off the vehicle 1 (Step S12). After the occupants unboards, the vehicle 1 notifies the server 2 that the occupant unboards. Specifically, the vehicle 1 transmits an unboarding notification to the server 2 (Step S13).

After the occupant unboards, the server 2 settles a use charge of the mobility service (Step S14). For example, the server 2 makes settlement of the use charge based on the user information stored in the storage device 22 of the server 2 through account transfer or credit card payment. After the use charge is settled, the vehicle 1 transmits settlement information including a settlement detail to the portable terminal 3 (Step S15).

As described above, the vehicle 1 transports the occupant through autonomous traveling. At this time, in a case where an upper limit value of an acceleration or deceleration of the vehicle 1 is set to be small, the vibration of the vehicle 1 is reduced; however, the traveling performance of the vehicle 1 is degraded. For this reason, in order to efficiently operate the vehicle 1 while securing the safety of the occupant, there is a need to set the upper limit value of the acceleration or deceleration of the vehicle 1 to an appropriate value.

However, the appropriate value is different depending on a condition. Accordingly, in the embodiment, the upper limit value of the acceleration or deceleration of the vehicle 1 is changed according to at least one predetermined condition. With this, in a case where the vehicle 1 is made to autonomously travel, the upper limit value of the acceleration or deceleration of the vehicle 1 can be set to the appropriate value.

Figure 4:
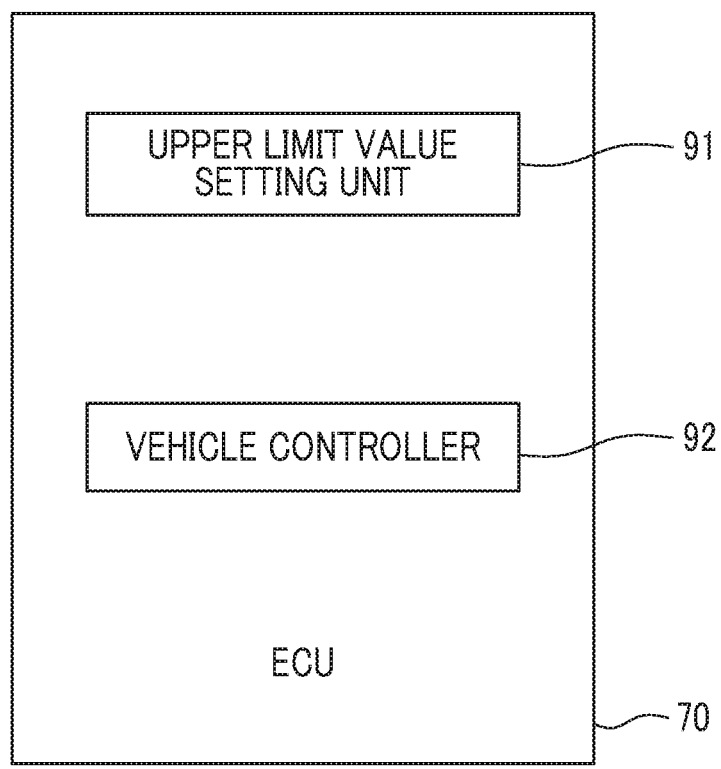
FIG. 4 is a functional block diagram of an ECU of the vehicle in the first embodiment.

FIG. 4 is a functional block diagram of the ECU 70 of the vehicle 1 in the first embodiment. In the embodiment, the ECU 70 has an upper limit value setting unit 91 and a vehicle controller 92. The upper limit value setting unit 91 and the vehicle controller 92 are functional blocks that are implemented by the processor 73 of the ECU 70 executing the program stored in the memory 72 of the ECU 70.

The upper limit value setting unit 91 sets the upper limit value of the acceleration or deceleration of the vehicle 1 (hereinafter, simply referred to as an "upper limit value"). Specifically, the upper limit value setting unit 91 changes the upper limit value according to at least one predetermined condition. In the acceleration or deceleration of the vehicle 1, at least one of a longitudinal acceleration or deceleration (so-called longitudinal G) of the vehicle 1 and a lateral acceleration or deceleration (so-called lateral G) of the vehicle 1 is included.

For example, in a case where an occupant is not present in the vehicle 1, there is no need to restrict the upper limit value in order to secure the safety of the occupant. For this reason, the upper limit value setting unit 91 changes the upper limit value according to the presence or absence of an occupant of the vehicle 1. In other words, the upper limit value setting unit 91 changes the upper limit value according to whether or not an occupant is present in the vehicle 1. Specifically, the upper limit value setting unit 91 sets the upper limit value when an occupant is present in the vehicle 1 to be smaller than the upper limit value when an occupant is not present in the vehicle 1.

In a case where an occupant does not sit on the seat, and in a case where the acceleration or deceleration of the vehicle 1 increases, there is a concern that the occupant falls down. For this reason, in a case where an occupant is present in the vehicle 1, the upper limit value setting unit 91 changes the upper limit value according to the posture of the occupant. In other words, in a case where an occupant is present in the vehicle 1, the upper limit value setting unit 91 changes the upper limit value according to whether or not the occupant sits on the seat. Specifically, in a case where an occupant is present in the vehicle 1, the upper limit value setting unit 91 sets the upper limit value when an occupant does not sit on the seat to be smaller than the upper limit value when an occupant sits on the seat.

Even though the occupant sits on the seat, in a case where the occupant does not wear the seat belt, and in a case where the acceleration or deceleration of the vehicle 1 increases, there is a concern that the occupant is in danger. For this reason, in a case where an occupant is present in, the vehicle 1, the upper limit value setting unit 91 changes the upper limit value according to the presence or absence of wearing of the seat belt on the occupant. In other words, in a case where an occupant is present in the vehicle 1 the upper limit value setting unit 91 changes the upper limit value accord ng to whether or not the occupant wears the seat belt. Specifically, in a case where an occupant is present in the vehicle 1, the upper limit value setting unit 91 sets the upper limit value when the occupant does not sit on the seat to be smaller than the upper limit value when the occupant sits on the seat.

In a case where the occupant is a disabled person, there is a need to restrict the acceleration or deceleration of the vehicle 1 in order to secure the safety of the occupant. For this reason, in a case where an occupant is present in the vehicle 1, the upper limit value setting unit 91 changes the upper limit value according to the presence or absence of a disabled person. In other words, in a case where an occupant is present in the vehicle 1, the upper limit value setting unit 91 changes the upper limit value according to whether or not the occupant is a disabled person. Specifically, in a case where an occupant is present in the vehicle 1, the upper limit value setting unit 91 sets the upper limit value when the occupant is a disabled person to be smaller than the upper limit value when the occupant is not a disabled person.

Even in a case where the occupant is a baby or an old person, there is a need to restrict the acceleration or deceleration of the vehicle 1 in order to secure the safety of the occupant. For this reason, in a case where an occupant is present in the vehicle 1, the upper limit value setting unit 91 changes the upper limit value according to an age of the occupant. In other words, in a case where an occupant is present in the vehicle 1, the upper limit value setting unit 91 changes the upper limit value according to whether or not the occupant is a baby or an old person. Specifically, in a case where an occupant is present in the vehicle 1, the upper limit value setting unit 91 sets the upper limit value when the occupant is a baby or an old person to be smaller than the upper limit value when the occupant is not a baby or an old person.

In a case where the upper limit value is designated by the occupant, it is desirable to set the upper limit value as desired by the occupant. For this reason, in a case where an occupant is present in the vehicle 1, the upper limit value setting unit 91 sets the upper limit value to a value designated by the occupant.

The vehicle controller 92 controls the vehicle 1 using the actuator 86 based on the traveling plan generated by the server 2. The vehicle controller 92 controls the vehicle 1 such that the acceleration or deceleration of the vehicle 1 does not exceed the upper limit value set by the upper limit value setting unit 91.

Upper Limit Value Setting Processing

Figure 5:
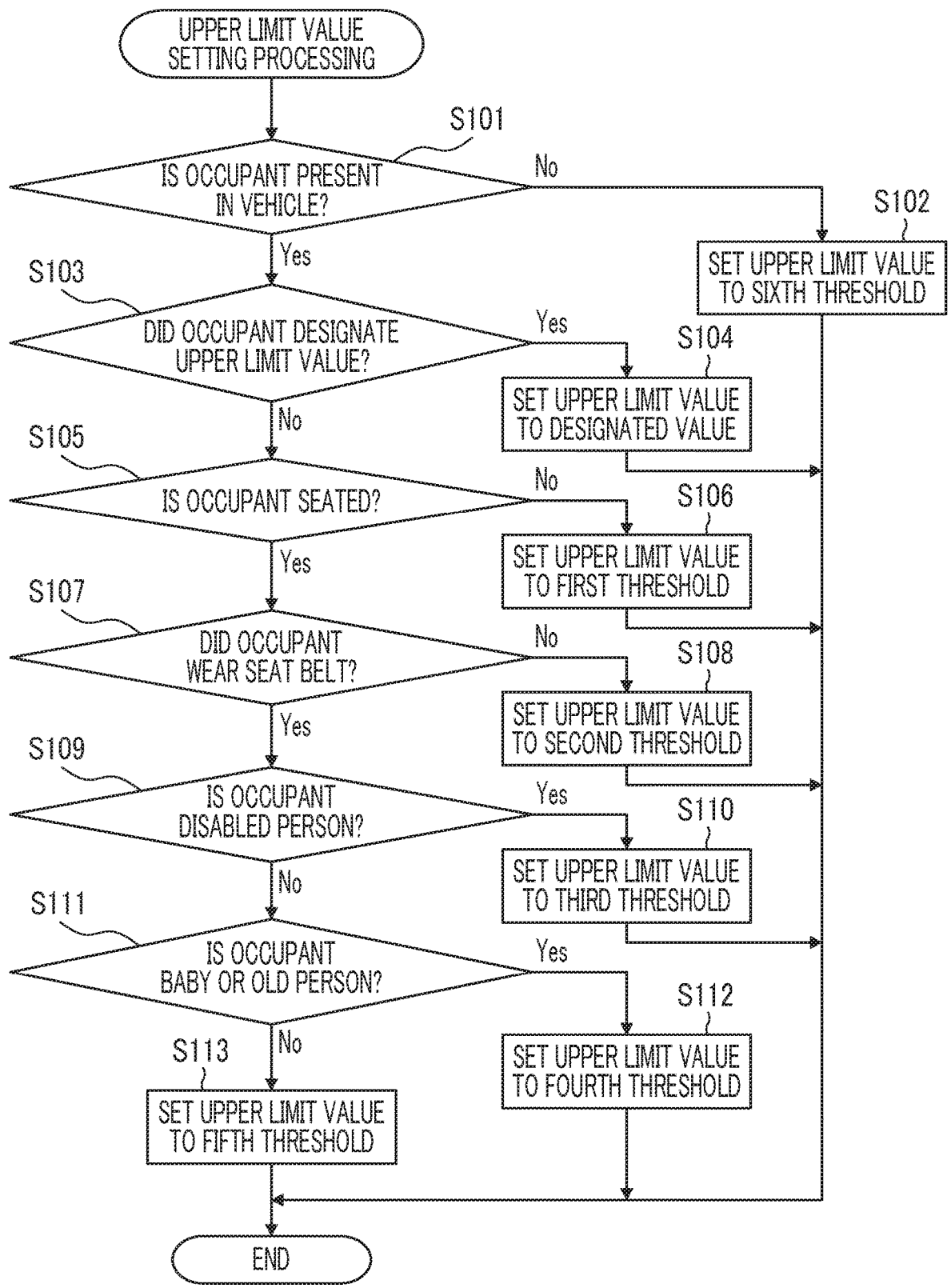
FIG. 5 is a flowchart showing a control routine of upper limit value setting processing in the first embodiment.

Hereinafter, control for setting the upper limit value will be described in detail referring to FIG. 5. FIG. 5 is a flowchart showing a control routine of upper limit value setting processing in the first embodiment. The control routine is repeated executed at predetermined execution intervals by the ECU 70.

First, in Step S101, the upper limit value setting unit 91 determines whether or not an occupant is present in the vehicle 1 using the in-vehicle state detection device 83. For example, the upper limit value setting unit 91 analyzes the image generated by the in-vehicle camera 11, thereby determining whether or not an occupant is present in the vehicle 1. The upper limit value setting unit 91 may determine whether or not an occupant is present in the vehicle 1 based on the output of the seat belt sensor or the seating sensor. The upper limit value setting, unit 91 may determine whether or not an occupant is present in the vehicle 1 based on the input of the occupant to the information reader. The upper limit value setting unit 91 may determine whether or not an occupant is present in the vehicle 1 based on the traveling plan generated by the server 2.

In a case where determination is made in Step S101 that an occupant is not present in the vehicle 1, that is, in a case where determination is made that the vehicle 1 is traveling in an unmanned state, the control routine progresses to Step S102. In Step S102 the upper limit value setting unit 91 sets the upper limit value to a sixth threshold. The sixth threshold is determined in advance and is set to a maximum value. That is, the upper limit value setting unit 91 sets the upper limit value to the maximum when an occupant is not present in the vehicle 1. After Step S102, the control routine ends.

In a case where determination is made in Step S101 that an occupant is present in the vehicle 1, the control routine progresses to Step S103. In Step S103, the upper limit value setting unit 91 determines whether or not the occupant designates the upper limit value based on an input of the occupant to the input/output device. The input/output device is, for example, the HMI 87 or the portable terminal 3. The occupant designates the upper limit value by a button operation, a voice input, or the like through the input/output device. A plurality of candidates of the upper limit value may be displayed to the occupant on the input/output device, and the occupant may designate the upper limit value from among the candidates. The upper limit value setting unit 91 may receive the input of the occupant from the server 2.

In a case where determination is made in Step S103 that the occupant designates the upper limit value, the control routine progresses to Step S104. In Step S104, the upper limit value setting unit 91 sets the upper limit value to the value designated by the occupant. After Step S104, the control routine ends.

In a case where determination is made in Step S103 that the occupant does not designate the upper limit value, the control routine progresses to Step S105. In Step S105, the upper limit value setting unit 91 determines whether or not the occupant sits on the seat using the in-vehicle state detection device 83. For example the upper limit value setting unit 91 determines whether or not the occupant sits on the seat based on the output of the seating sensor. The upper limit value setting unit 91 analyzes the image generated by the in-vehicle camera 11, thereby determining whether or not the occupant sits on the seat.

In a case where determination is made in Step S105 that the occupant does not sit on the seat, that is, in a case where determination is made that the occupant is standing, the control routine progresses to Step S106. In Step S106, the upper limit value setting unit 91 sets the upper limit value to a first threshold. The first threshold is set to a minimum value determined in advance. That is, the upper limit value setting unit 91 sets the upper limit value to the minimum when the occupant does not sit on the seat. After Step S106, the control routine ends.

In a ease where determination is made in Step S105 that the occupant sits on the seat, the control routine progresses to Step S107. In Step S107, the upper limit value setting unit 91 whether or not the occupant wears the seat belt using the in-vehicle state detection device 83. For example, the upper limit value setting unit 91 determines whether or not the occupant wears the seat belt based on the output of the seat belt sensor. The upper limit value setting unit 91 analyzes the image generated by the in-vehicle camera 11, thereby determining whether or not the occupant wears the seat belt.

In a case where determination is made in Step S107 that the occupant does not wear the seat belt, the control routine progresses to Step S108. In Step S108 the upper limit value setting unit 91 sets the upper limit value to a second threshold. The second threshold is determined in advance and is set to a value between the first threshold and the sixth threshold. The second threshold may be the same as the first threshold. After Step S108, the control routine ends.

In a case where determination is made in Step S107 that the occupant wears the seat belt the control routine progresses to Step S109. In Step S109, the upper limit value setting unit 91 determines whether or not the occupant is a disabled person using the in-vehicle state detection device 83. For example, the upper limit value setting unit 91 analyzes the image generated by the in-vehicle camera 11, and in a case where a wheelchair is detected, determines the occupant is a disabled person. The upper limit value setting unit 91 may determine whether or not the occupant is a disabled person based on an input of the occupant to the input/output device. The input/output device is, for example, the HMI 87 or the portable terminal 3. The occupant input whether or not he/she is a disabled person by a button operation, a voice input, or the like through the input/output device. The upper limit value setting unit 91 may receive the input of the occupant from the server 2.

In a case where determination is made in Step S109 that the occupant is a disabled person, the control routine progresses to Step S110. In Step S110, the upper limit value setting unit 91 sets the upper limit value to a third threshold. The third threshold is determined in advance and is set to a value between the second threshold and the sixth threshold. The third threshold may be the same as the second threshold. After Step S110, the control routine ends.

In a case where determination is made in Step S109 that the occupant is not a disabled person, the control routine progresses to Step S111. In Step S111, the upper limit value setting unit 91 determines whether or not the occupant is a baby or an old person. For example, the upper limit value setting unit 91 analyzes the image generated by the in-vehicle camera 11 to estimate the age of the occupant, and in a case where the age of the occupant is within a predetermined range, determines that the occupant is a baby or an old person. For example, the upper limit value setting unit 91 determines that the occupant is a baby in a case where the age of the occupant is equal to or less than six and determines that the occupant is an old person in a case where the age of the occupant is equal to or greater than 65. The upper limit value setting unit 91 may acquire the age of the occupant based on an input of the occupant to the input/output device. The input/output device is, for example, the HMI 87 or the portable terminal 3. The occupant Inputs the age by a button operation, a voice input, or the like through the input/output device. The upper limit value setting unit 91 may receive the input of the occupant from the server 2.

In a ease where determination is made in Step S111 that the occupant is a baby or an old person, the control routine progresses to Step S112. In Step S112, the upper limit value setting unit 91 sets the upper limit value to a fourth threshold. The fourth threshold is determined in advance and is set to a value between the third threshold and the sixth threshold. The fourth threshold may be the same as the third threshold.

In a case where determination is made in Step S111 that the occupant is not a baby or an old person, the control routine progresses to Step S113. In Step S113, the upper limit value setting unit 91 sets the upper limit value to a fifth threshold. The fifth threshold is determined in advance and is set to a value between the fourth threshold and the sixth threshold. After Step S113, the control routine ends.

In the control routine, although a plurality of conditions is used in order to set the upper limit value, any one or more conditions may be used in order to set the upper limit value. That is, Steps S101 and S102, Steps S103 and S104, Steps S105 and S106, Steps S107 and S108, Steps S109 and S110, or Steps S111 and S112 may be omitted. Any two steps of Steps S103, S105, S107, S109, and S111 may be replaced. That is, for example, the upper limit value that is set in a case where determination is made the occupant is a disabled person may be smaller than the upper limit value that is set in a case where determination is made that the occupant does not sit on the seat.

In a case where a plurality of occupants is present in the vehicle 1, in each step of Steps S103, S105, S107, S109, and S111, determination is made whether or not at least one occupant satisfies each condition.

The upper limit value setting unit 91 may transmit the change of the upper limit value to the occupant when the upper limit value is changed. With this, it is possible to restrain the occupant from feeling uneasiness about the behavior of the vehicle 1. The upper limit value setting unit 91 transmits the change of the upper limit value to the occupant through the output device, such as the HMI 87 or the portable terminal 3. For example, the upper limit value setting unit 91 transmits the values of the upper limit values before and, after the change to the occupant. The upper limit value setting unit 91 may transmit an increase or a decrease in upper limit value to the occupant.

Second Embodiment

The configuration and control of an occupant transportation system and a vehicle according to a second embodiment are basically the same as those in the first embodiment except for the following points. For this reason, in regard to the second embodiment of the disclosure, description will be provided focusing on portions different from in the first embodiment.

Figure 6:
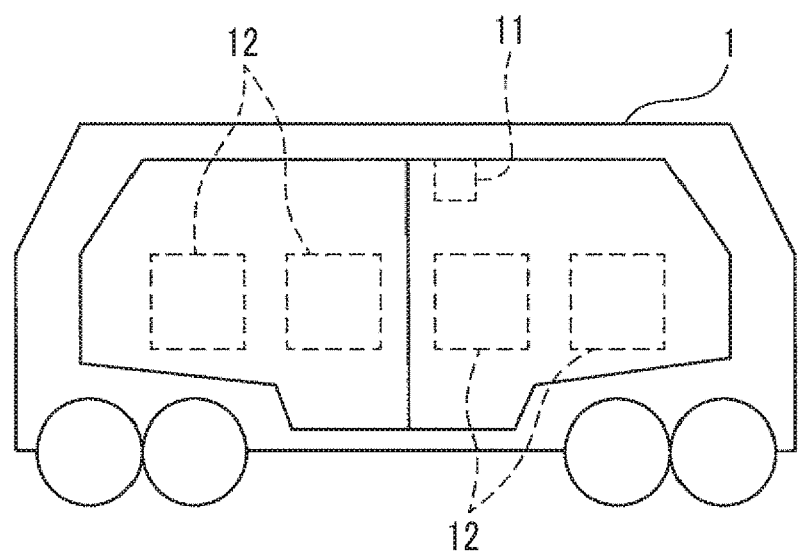
FIG. 6 is a diagram schematically showing a vehicle in a second embodiment.

In the second embodiment, the vehicle 1 is used for a delivery service, and as shown in FIG. 6, the vehicle 1 transports a package 12, in order to efficiently transport the package 12 without causing damage to the package 12, there is a need to set the upper limit value of the acceleration or deceleration of the vehicle 1 to an appropriate value. However, in a case where the vehicle 1 transports the package 12, In order to set the upper limit value, there is a need to take into consideration a condition different from in a case where the vehicle 1 transports an occupant.

For example, in a case, where the package 12 is not present in the vehicle 1, there is no need to restrict the upper limit value. For this reason, the upper limit value setting unit 91 changes the upper limit value according to the presence or absence of the package 12. In other words, the upper limit value setting unit 91 changes the upper limit value whether or not the package 12 is present in the vehicle 1. Specifically, the upper limit value setting unit 91 sets the upper limit value when the package 12 is present in the vehicle 1 to be smaller than the upper limit value when the package 12 is not present in the vehicle 1.

In a case where the total weight of the package 12 is heavy, since the deceleration performance or the like of the vehicle 1 is degraded, there is a need to restrict the upper limit value. For this reason, in a case where the vehicle 1 transports the package 12, the upper limit value setting unit 91 changes the upper limit value according to the total weight of the package 12.

In a case where the strength of the package 12 is low, there is a need to restrict the upper limit value in order to restrain damage to the package 12. For this reason, in a case where the vehicle 1 transports the package 12, the upper limit value setting unit 91 changes the upper limit value according, to the strength of the package 12.

In a case where the upper limit value is designated by a person, such as a worker who loads the package 12 in the vehicle 1 (hereinafter, simply referred to as a "worker") or a manager of the vehicle 1 (hereinafter, simply referred to as a "manager"), it is desirable to set the upper limit value to the designated value. For this reason, in a case where the vehicle 1 transports the package 12, the upper limit value setting unit 91 sets the upper limit value to the value designated by the person.

Upper Limit Value Setting Processing

Figure 7:
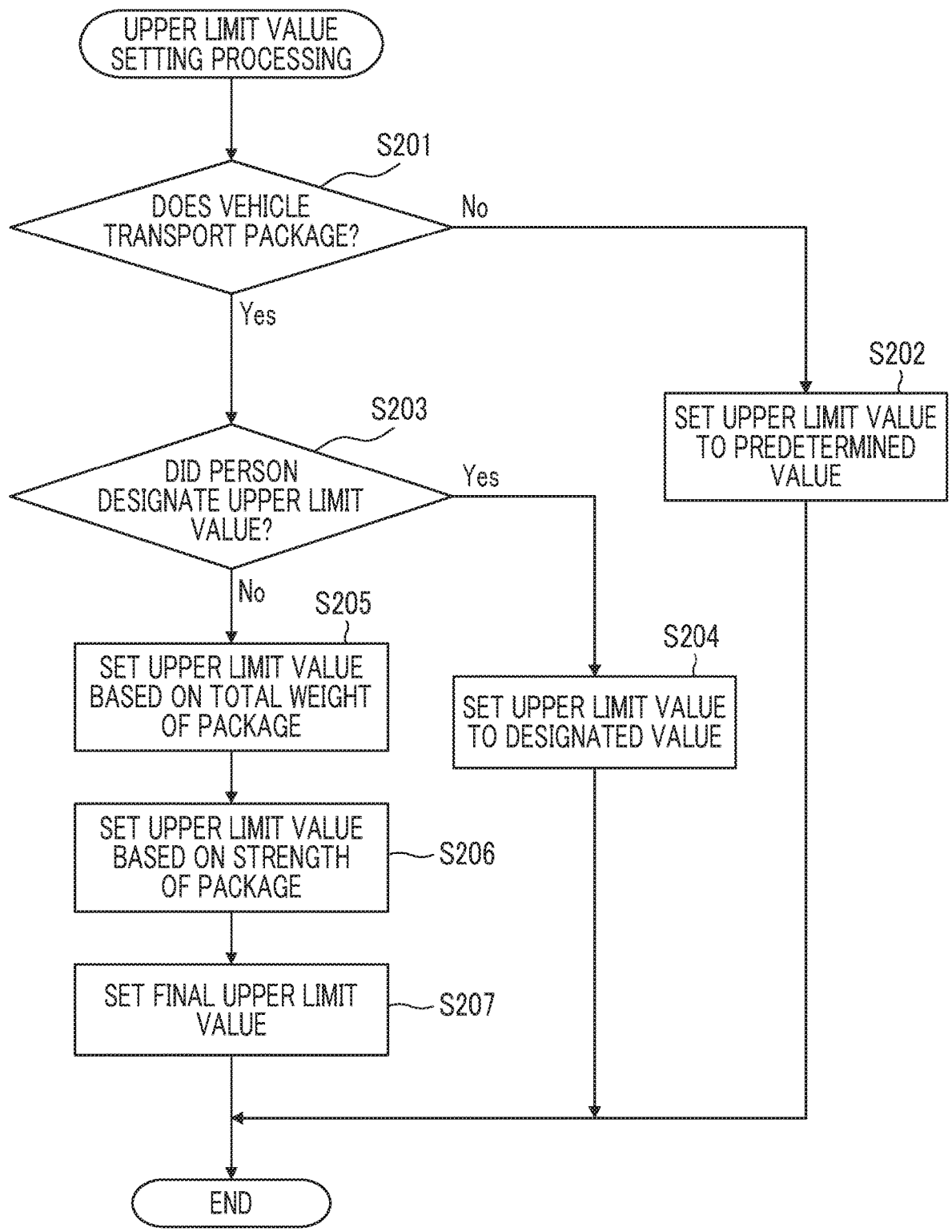
FIG. 7 is a flowchart showing a control routine of upper limit value setting processing in the second embodiment.

FIG. 7 is a flowchart showing a control routine of upper limit value setting processing in the second embodiment. The control routine is repeatedly executed at predetermined execution intervals by the ECU 70.

First, in Step S201, the upper limit value setting unit 91 determines whether or not the vehicle 1 transports the package 12 using the in-vehicle state detection device 83. For example, the upper limit value setting unit 91 analyzes the image generated b the in-vehicle camera 11, thereby determining whether or not the vehicle 1 transports the package 12. The upper limit value setting unit 91 may determine whether or not the vehicle 1 transports the package 12 based on an input of the person to the input/output device. The input/output device is, for example, the HMI 87 or the portable terminal 3. A person, such as a worker or a manager, inputs transportation information of the package 12 by a button operation, a voice input, or the like through the input/output device. The upper limit value setting unit 91 may receive the input of the person from the server 2.

In a case where determination is made in Step S201 that the vehicle 1 does not transport the package 12, the control routine progresses to Step S202. In Step S202, the upper limit value setting unit 91 sets the upper limit value to a predetermined value. The predetermined value is determined in advance and is set to a maximum value. That is, when the vehicle 1 does not transport the package 12, the upper limit value setting unit 91 sets the upper limit value to the maximum. After Step S202, the control routine ends.

In a case where determination is made in Step S201 that the vehicle 1 transports the package 12, the control routine progresses to Step S203. In Step S203, the upper limit value setting unit 91 determines whether or not the person designates the upper limit value based on an input of the person to the input/output device. The input/output device is, for example, the HMI 87 or the portable terminal 3. A person, such as a worker or a manager, designates the upper limit value by a button operation, a voice input, or the like through the input/output device. A plurality of candidates of the upper limit value may be displayed to the person on the input/output device, and the person may designate the upper limit value from among the candidates. The upper limit value setting unit 91 may receive the input of the person from the server 2.

In a case where determination is made in Step S203 that the person designates the upper limit value, the control routine progresses to Step S204. In Step S204, the upper limit value setting unit 91 sets the upper limit value to the value designated by the person. After Step S204, the control routine ends.

In a case where determination is made in Step S203 that the person does not designate the upper limit value, the control routine progresses to Step S205. In Step S205, the upper limit value setting unit 91 sets the upper limit value based on the total weight of the package 12. Specifically, the upper limit value setting unit 91 sets the upper limit value when the total weight of the package 12 is equal to or greater than a predetermined value to be smaller than the upper limit value when the total weight of the package 12 is less than the predetermined value. For example, the upper limit value setting unit 91 sets the upper limit value to be smaller when the total weight of the package 12 is heavier.

In the second embodiment, the in-vehicle state detection device 83 further includes a weight sensor and the upper limit value setting unit 91 detects the total weight of the package 12 using the weight sensor. The upper limit value setting unit 91 may detect the total weight of the package 12 based on an input of the person to the input/output device. The input/output device is, for example, the HMI 87 or the portable terminal 3. A person, such as a worker or a manager, inputs the total weight of the package 12 by a button operation, a voice input, or the like through the input/output device. The upper limit value setting unit 91 may detect the total weight of the package 12 from weight information of the package 12 stored in an IC tag (for example, RF tag) attached to the package 12. The upper limit value setting unit 91 may detect the total weight of the package 12 through communication with the server 2. That is, the upper limit value, setting unit 91 may receive the total weight of the package 12 from the server 2.

The upper limit value setting unit 91 may calculate a loading rate of the vehicle 1 based on the total weight of the package 12 and may set the upper limit value based on the loading rate of the vehicle 1. Specifically, the upper limit value setting unit 91 sets the upper limit value when the loading rate of the vehicle 1 is equal to or greater than a predetermined value to be smaller than the upper limit value when the loading rate of the vehicle 1 is less than the predetermined value. For example, the upper limit value setting unit 91 sets the upper limit value to be smaller when the loading rate of the vehicle 1 is higher.

Next, in Step S206, the upper limit value setting unit 91 sets the upper limit value based on the strength of the package 12. Specifically, the upper limit value setting unit 91 sets the upper limit value when the strength of the package 12 is equal to greater than the predetermined value to be smaller than the upper limit value when the strength of the package 12 is less than the predetermined value. For example, the upper limit value setting unit 91 sets the upper limit value to be smaller when the strength of the package 12 is lower. In a case where the vehicle 1 transports a plurality of packages 12, the upper limit value setting unit 91 sets the upper limit value based on the strength of the package 12 having the lowest strength.

For example, the upper limit value setting unit 91 detects the strength of the package 1 based on an input of the person to the input/output device. The input/output device is, for example, the HMI 87 or the portable terminal 3. A person, such as a worker or, a manager, inputs the strength of the package 12 by a button operation, a voice input, or the like through the input/output device. In this case, in order to indicate that a fragile thing is included in the package 12, solely the strength of the package 12 having strength less than the predetermined value may be input to the input/output device.

The upper limit value setting unit 91 may detect the strength of the package 12 from strength information of the package 12 stored in an IC tag (for example, RF lag) attached to the package 12. In this case, in order to indicate that a fragile thing is included in the package 12, the IC tag may be attached, solely to the package 12 having strength less than the predetermined value. The upper limit value setting unit 91 may detect the strength of the package 12 through communication with the server That is, the upper limit value setting unit 91 may receive the strength of the package 2 from the server 2. In this case, in order to indicate that a fragile thing is included in the package 12, the server 2 may transmit solely the strength of the package 12 having strength less than the predetermined value.

Next, in Step S207, the upper limit value setting unit 91 sets a final upper limit value. Specifically, the upper limit value setting unit 91 compares the upper limit value set in Step S205 with the upper limit value set in Step S206, and sets the minimum upper limit value as the final upper limit value. After Step S207, the control routine ends.

Third Embodiment

The configuration and control of an occupant transportation system and a vehicle according to a third embodiment are basically the same as those in the first embodiment except for the following points. For this reason, in regard to the third embodiment of the disclosure, description will be provided focusing on portions different from in the first embodiment.

In the first embodiment, the vehicle 1 transports the occupant, and in the second embodiment, the vehicle 1 transports the package 12. In the third embodiment, the vehicle 1 transports at least one the occupant and the package 12.

Upper Limit Value Setting Processing

Figure 8A:
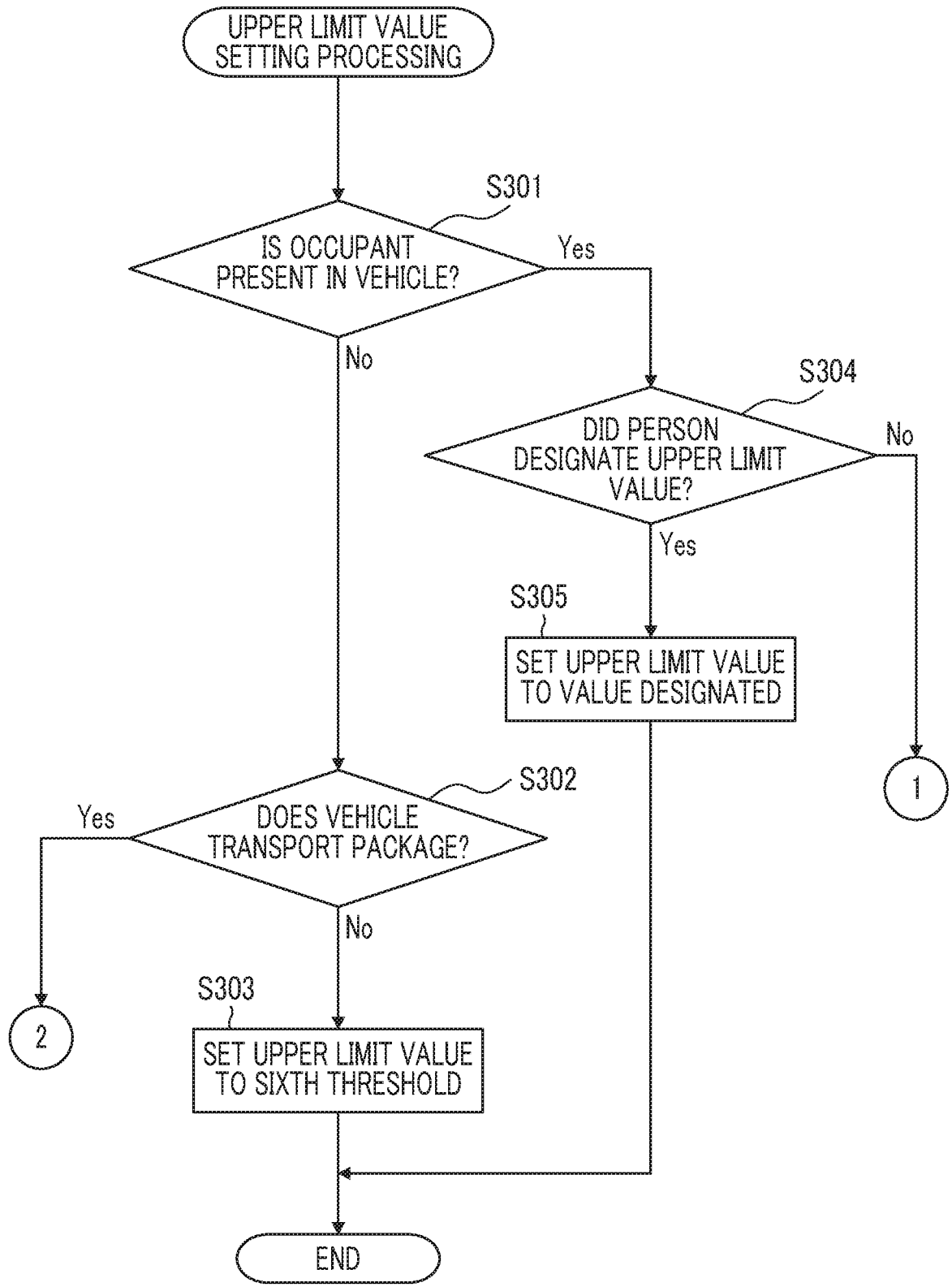
FIG. 8A is a flowchart showing a control routine of upper limit value setting processing in the third embodiment.
Figure 8B:
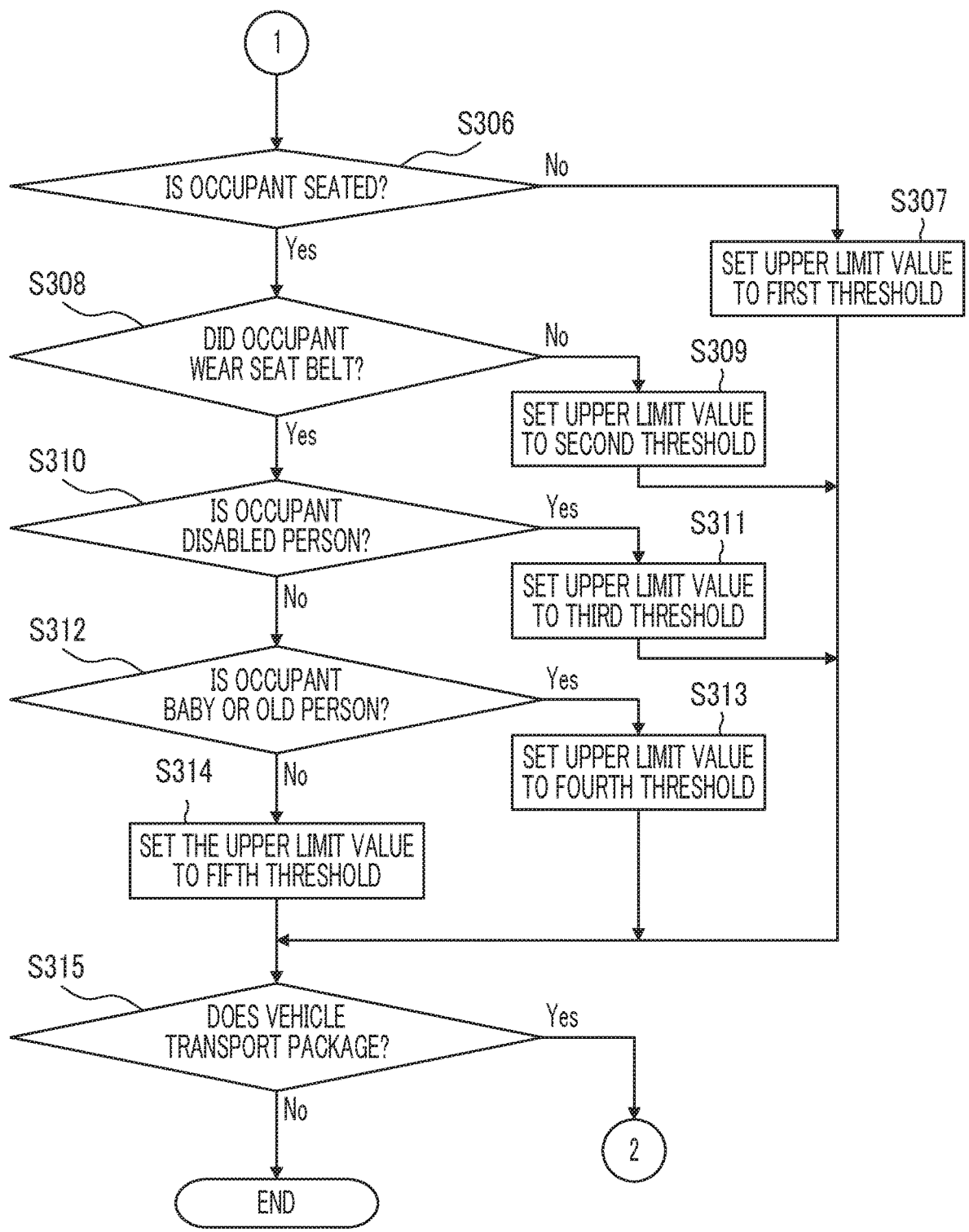
FIG. 8B is a flowchart showing the control routine of the upper limit value setting processing in the third embodiment.
Figure 8C:
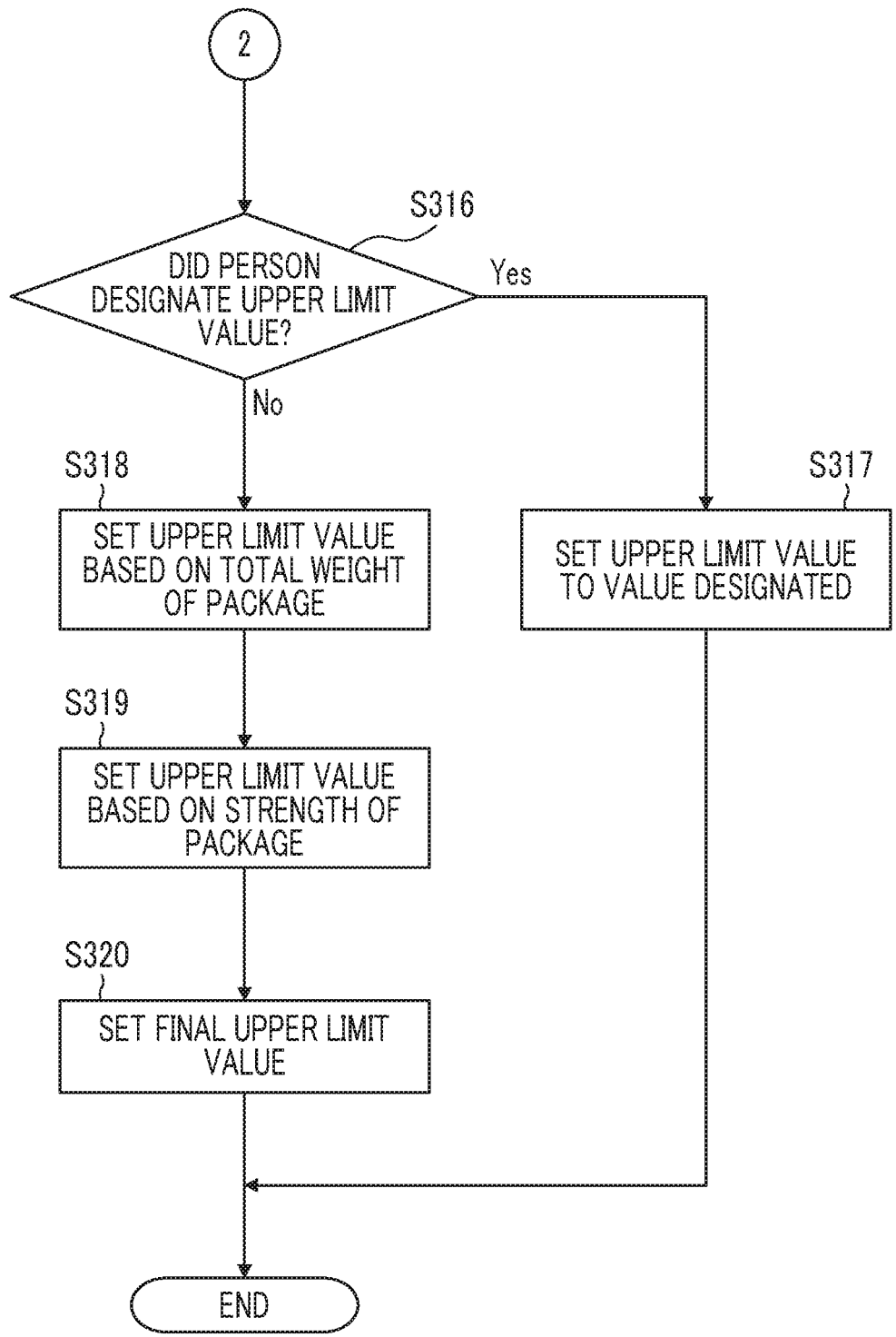
FIG. 8C is a flowchart showing the control routine of the upper limit value setting processing in the third embodiment.

FIGS. 8A to 8C are flowcharts showing a control routine of upper limit value setting processing in the third embodiment. The control routine is repeatedly executed at predetermined execution intervals by the ECU 70.

First, in Step S301, similarly to Step S101 of FIG. 5, the upper limit value setting unit 91 determines whether or not an occupant is present in the vehicle 1. In a case where determination is made that an occupant is not present in the vehicle 1, the control routine progresses to Step S302.

In Step S302, similarly to Step S201 of FIG. 7, the upper limit value setting unit 91 determines whether or not the vehicle 1 transports the package 12. In a case where determination is made that the vehicle 1 does not transport the package 12, the control routine progresses to Step S303.

In Step S303, the upper limit value setting unit 91 sets the upper limit value to the sixth threshold. The sixth threshold is predetermined in advance and is set to the maximum value. That is in a case where an occupant and the package 12 are not present in the vehicle 1, the upper limit value setting unit 91 sets the upper limit value to the maximum. After Step S303, the control routine ends.

In a case where determination is made in Step S302 that the vehicle 1 transports the package 12, the control routine progresses to Step S316. Steps S316 to S320 are executed similarly to Steps S203 to S207 of FIG. 7. After Step S320, the control routine ends.

In a case where determination is made in Step S301 that an occupant is present in the vehicle 1, the control routine progresses to Step S304. In Step S304, similarly to Step S103 of FIG. 5, the upper limit value setting unit 91 determines whether or not the occupant designates the upper limit value. In a case, where determination is made that the occupant designates the upper limit value, the control routine progresses to Step S305.

In Step S305, the upper limit value setting unit 91 sets the upper limit value to the value designated by the occupant. After Step S305, the control routine ends.

In a case where determination is made in Step S304 that the occupant does not designate the upper limit value, the control routine progresses to Step S306. Steps S306 to S314 are executed similarly to Steps S105 to S113 of FIG. 5.

After Step S307, S309, S311, S313, or S314, the control routine progresses to Step S315. In Step S315, similarly to Step S201 of FIG. 7, the upper limit value setting unit 91 determines whether or not the vehicle 1 transports the package 12. In a case where determination is made that the vehicle 1 does not transport the package 12, the control routine ends.

In a case where determination is made that the vehicle 1 transports the package, the control routine progresses to Step S316. Steps S316 to S319 are executed similarly to Steps S203 to S206 of FIG. 7. After Step S319, in Step S320, the upper limit value setting unit 91 compares the upper limit value set in Step S307, S309, S311, S313, or S314 with the upper limit value set in Step S318 and the upper limit value set in Step S319, and sets the minimum upper limit value as the final upper limit value. After Step S320, the control routine ends.

The control routine of FIGS. 8A to 8C can be modified similarly to the control routines of FIGS. 3 and 7.

Fourth Embodiment

The configuration and control of an occupant transportation system and a vehicle according to a fourth embodiment are basically the same as those in the first embodiment except for the following points. For this reason, in regard to the fourth embodiment of the disclosure, description will be provided focusing on portions different from in the first embodiment.

A desired arrival time at a destination may be designated according to a schedule of an occupant or a delivery schedule of the package 12. In this case, in order to increase the satisfaction of the service using the vehicle it is desirable that the desired arrival time is strictly kept. However, the time at which the vehicle 1 arrives at the destination may be late due to congestion or the like.

Basically, when the upper limit value is greater, it is possible to more increase the acceleration performance and deceleration performance of the vehicle 1, and to more increase an average speed of the vehicle 1. For this reason, the upper limit value increases, whereby it is possible to reduce a needed time to the destination.

Accordingly, in the fourth embodiment, the upper limit value setting unit 91 changes the upper limit value according to the desired arrival time at the destination. With this, it is possible to restrain the time at which the vehicle 1 arrives at the destination from being later than the desired arrival time, and consequently, to increase the satisfaction of the service using the vehicle 1.

For example, in a case where an estimated arrival time at the destination is later than the desired arrival time at the destination, the upper limit value setting unit 91 sets the upper limit value to be greater than a current value. In a case where the estimated arrival time is later than the desired arrival time and the difference between the estimated arrival time and the desired arrival time is equal to greater than a predetermined value, the upper limit value setting unit 91 may set the upper limit value to be greater than the current value.

Upper Limit Value Setting Processing

Figure 9:
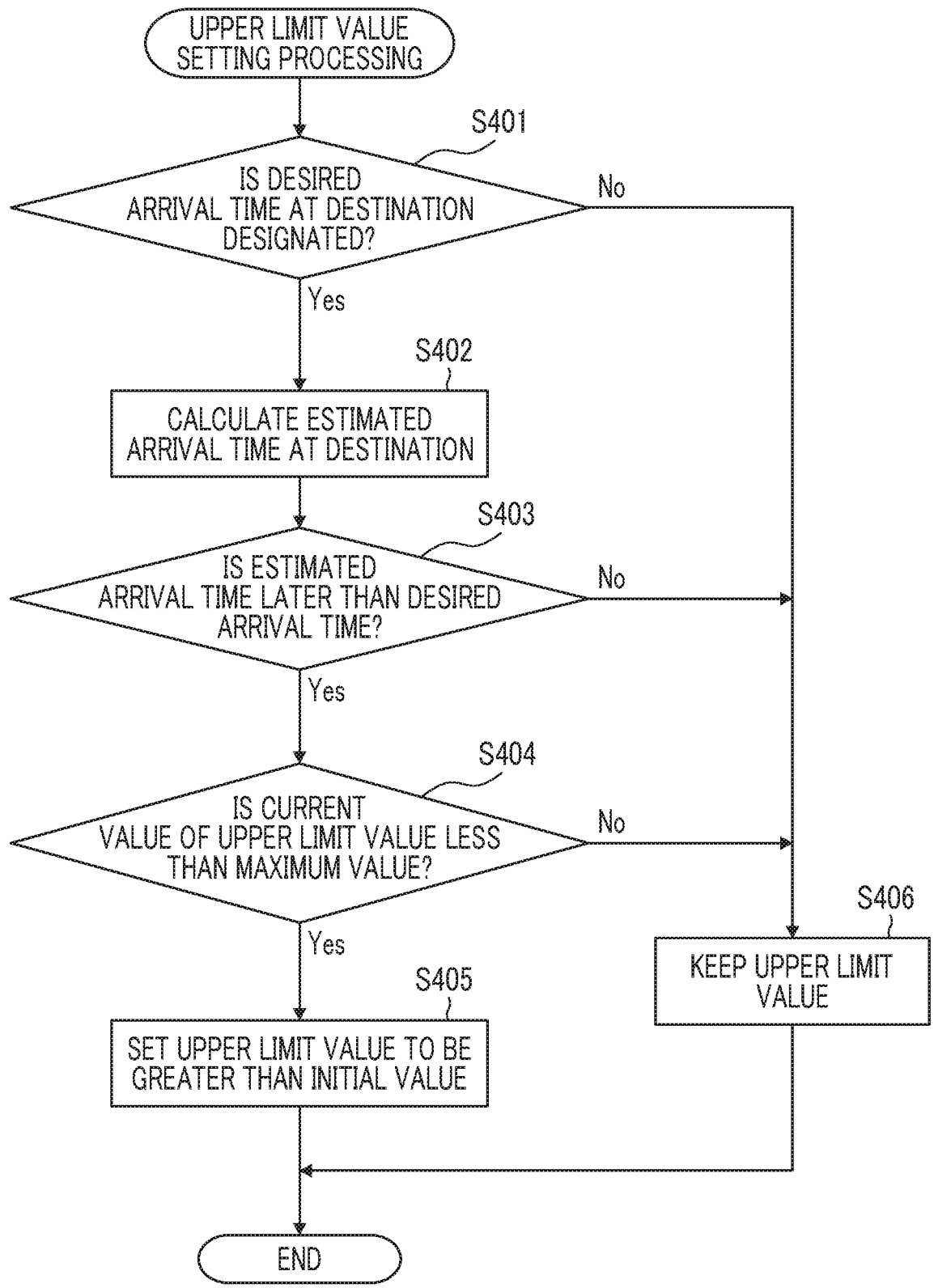
FIG. 9 is a flowchart showing a control routine of upper limit value setting processing in a fourth embodiment.

FIG. 9 is a flowchart showing a control routine of upper limit value setting processing in the fourth embodiment. The control routine is repeatedly executed at predetermined execution intervals by the ECU 70.

First, in Step S401, the upper limit value setting unit 91 determines whether or not the desired arrival time at the destination is designated by an input of a person to the input/output device. The input/output device is, for example, the HMI 87 or the portable terminal 3. A person, such as an occupant of the vehicle 1, a worker, or a manager, designates the desired arrival time at the destination by a button operation, a voice input, or the like through the input/output device. The upper limit value setting unit 91 may receive the input of the person from the server 2.

In a case where determination is made in Step S401 that the desired arrival time at the destination is designated, the control routine progresses to Step S402. In Step S402, the upper limit value setting unit 91 calculates the estimated arrival time at the destination. The upper limit value setting unit 91 calculates the estimated arrival time at the destination based on a distance from a current position to the destination, a current value of the upper limit value, a traffic condition of the traveling route, and the like.

Next, in Step S403, the upper limit value setting unit 91 determines whether or not the estimated arrival time is later than the desired arrival time. In a case where determination is made in Step S403 that the estimated arrival time is later than the desired arrival time, the control routine, progresses to Step S404.

In Step S404, the upper limit value setting unit 91 determines whether or not the current value of the upper limit value is less than the maximum value determined in advance. In a case Where determination is made that the current values of the upper limit value is less than the maximum value, the control routine progresses to Step S405. In Step S405, the upper limit value setting unit 91 sets the upper limit value to be greater than the current value. An initial value of the upper limit value is determined in advance and is set to a value less than the maximum value of the upper limit value.

For example, in Step S405, the upper limit value setting unit 91 increases the upper limit value by a predetermined amount. The upper limit value setting unit 91 may increase the predetermined amount when the difference between the estimated arrival time and the desired arrival time is greater. After Step S405, the control routine ends.

In a case where the determination in Step S401, S403, or S404 is negative, the control routine progresses to Step S406. In Step S406, the upper limit value setting unit 91 keeps the upper limit value. After Step S406, the control routine ends.

In Step S403, the upper limit value setting unit 91 determines whether or not the estimated arrival time is later than the desired arrival time and the difference between the estimated arrival tune and the desired arrival time is equal to greater than the predetermined value. The predetermined value is determined in advance.

Although the embodiments of the disclosure have been described, the disclosure is not limited to these embodiments, and various corrections and alterations may be made within the language of the claims. For example, the vehicle 1 may have a form, such as a passenger vehicle or a bus.

The above-described embodiments may be optionally combined and implemented. For example, in a case where the first embodiment and the fourth embodiment are combined, in the control routine of FIG. 9, in a case where the determination in Step S401, S403, or S404 is negative, the control routine progresses to Step S101 of FIG. 5 instead of Step S406.

In a case where the second embodiment and the fourth embodiment are combined, in the control routine of FIG. 9, in a case where the determination in Step S401, S403, or S404 is negative, the control routine progresses to Step S201 of FIG. 7 instead of Step S406.

In a case where the third embodiment and the fourth embodiment are combined, in the control routine of FIG. 9, in a case where the determination in Step S401, S403, or S404 is negative, the control routine progresses to Step S301 of FIG. 8A instead of Step S406.

What is claimed is:

1. A control device for a vehicle that controls the vehicle autonomously traveling, the control device comprising:
    an electronic control unit configured to set an upper limit value of an acceleration or deceleration of the vehicle to one of a plurality of preset threshold values based on whether an occupant is seated on a seat of the vehicle; and
    a vehicle controller being configured to control the vehicle such that the acceleration or deceleration does not exceed the upper limit value,
    wherein:
    the electronic control unit changes the upper limit value such that when the occupant is seated on the seat of the vehicle, the upper limit value is set to an amount that is higher than another amount that is associated with when the occupant is not seated on the seat of the vehicle;
    the electronic control unit is configured to alert the occupant when the upper limit value is changed.

2. The control device according to claim 1, wherein the electronic control unit is configured to, in a case where the occupant is present in the vehicle, change the upper limit value according to a posture of the occupant.

3. The control device according to claim 1, wherein the electronic control unit is configured to, in a case where the occupant is present in the vehicle, change the upper limit value according to the presence or absence of wearing of a seat belt on the occupant.

4. The control device according to claim 1, wherein the electronic control unit is configured to, in a case where the occupant is present in the vehicle, change the upper limit value according to the presence or absence of a disabled person.

5. The control device according to claim 1, wherein the electronic control setting unit is configured to, in a case where the occupant is present in the vehicle, change the upper limit value according to an age of the occupant.

6. The control device according to claim 1, wherein the electronic control unit is configured to, in a case where the occupant is present in the vehicle, set the upper limit value to a value designated by the occupant.

7. The control device according to claim 1, wherein the electronic control unit is configured to transmit the change of the upper limit value to the occupant of the vehicle.

8. The control device according to claim 1, wherein the electronic control unit is configured to change the upper limit value according to the presence or absence of a package.

9. The control device according to claim 1, wherein the electronic control unit is configured to, in another case where the vehicle transports a package, change the upper limit value according to a total weight of the package.

10. The control device according to claim 9, wherein the electronic control unit is configured to, in another case where the vehicle transports a package, change the upper limit value according to a loading rate of the vehicle.

11. The control device according to claim 1, wherein the electronic control unit is configured to, in another case where the vehicle transports a package, change the upper limit value according to strength of the package.

12. The control device according to claim 1, wherein the electronic control unit is configured to, in another case where the vehicle transports a package, sets the upper limit value to a value designated by a person.

13. An occupant transportation system comprising:
a server configured to create a traveling plan based on a vehicle allocation request from a user;
a vehicle controller configured to control the vehicle based on the traveling plan; and
an electronic control unit configured to set an upper limit value of an acceleration or deceleration of the vehicle to one of a plurality of preset threshold values based on whether an occupant is seated on a seat of the vehicle, wherein:
the vehicle controller is configured to control the vehicle such that the acceleration or deceleration does not exceed the upper limit;
the electronic control unit is configured to change the upper limit value such that when the occupant is seated on the seat of the vehicle, the upper limit value is set to an amount that is higher than another amount that is associated with when the occupant is not seated on the seat of the vehicle; and
the electronic control unit is configured to alert the occupant when the upper limit value is changed.

14. The control device according to claim 1, wherein:
the plurality of preset threshold values correspond to an age of the occupant of the vehicle; and
the electronic control unit changes the upper limit value to a lowest threshold value when the occupant whose age corresponds to the lowest threshold value is present in the vehicle.

15. The control device according to claim 13, wherein:
the plurality of preset threshold values correspond to an age of the occupant of the vehicle; and
the electronic control unit changes the upper limit value to a lowest threshold value when the occupant whose age corresponds to the lowest threshold value is present in the vehicle.

* * * * *